United States Patent
Zhang et al.

(10) Patent No.: US 10,636,008 B2
(45) Date of Patent: Apr. 28, 2020

(54) DATA PROCESSING SYSTEM AND METHOD

(71) Applicant: Huawei Technologies Co., Ltd., Shenzhen (CN)

(72) Inventors: Huimin Zhang, Shenzhen (CN); Kangmin Huang, Shenzhen (CN); Dawei Huo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 479 days.

(21) Appl. No.: 15/351,737

(22) Filed: Nov. 15, 2016

(65) Prior Publication Data

US 2017/0061367 A1    Mar. 2, 2017

Related U.S. Application Data

(63) Continuation of application No. PCT/CN2015/071644, filed on Jan. 27, 2015.

(30) Foreign Application Priority Data

May 15, 2014 (CN) .......................... 2014 1 0205427

(51) Int. Cl.
  *G06Q 10/08* (2012.01)
  *G06Q 30/02* (2012.01)
  *G06F 16/29* (2019.01)

(52) U.S. Cl.
  CPC .......... *G06Q 10/083* (2013.01); *G06F 16/29* (2019.01); *G06Q 30/0202* (2013.01)

(58) Field of Classification Search
  CPC ... G06Q 10/083; G06Q 30/0202; G06F 16/29
  See application file for complete search history.

(56) References Cited

U.S. PATENT DOCUMENTS

| | | | |
|---|---|---|---|
| 7,689,465 B1 * | 3/2010 | Shakes | G06Q 10/08 705/27.1 |
| 2001/0029472 A1 * | 10/2001 | Hataguchi | G06Q 30/06 705/26.42 |

(Continued)

FOREIGN PATENT DOCUMENTS

| | | | |
|---|---|---|---|
| CN | 1277693 A | 12/2000 | |
| CN | 1290373 A | 4/2001 | |

(Continued)

OTHER PUBLICATIONS

Foreign Communication From a Counterpart Application, Chinese Application No. 201410205427.5, Chinese Office Action dated Feb. 5, 2018, 10 pages.
Foreign Communication From a Counterpart Application, PCT Application No. PCT/CN2015/071644, English Translation of International Search Report dated May 4, 2015, 2 pages.

(Continued)

*Primary Examiner* — Sujay Koneru
(74) *Attorney, Agent, or Firm* — Conley Rose, P.C.

(57) ABSTRACT

A data processing system and method includes a first data processing device that generates commodity delivery information, and a second data processing device that provides a commodity delivery person with the commodity delivery information, where the first data processing device determines, according to historical information of users, multiple target users that potentially will purchase a specific commodity, acquires multiple pieces of address information that correspond to the multiple target users, combines the multiple pieces of address information to form one piece of commodity delivery information, and sends the commodity delivery information to the second data processing device.

27 Claims, 5 Drawing Sheets

---

The first data processing device determines, according to historical information of users, multiple target users that potentially will purchase a specific commodity; and acquires multiple pieces of address information that correspond to the multiple target users, and combines the multiple pieces of address information to form one piece of commodity delivery information

501

The first data processing device sends the commodity delivery information to the second data processing device that provides the commodity delivery person with the commodity delivery information, so that the second data processing device processes the commodity delivery information

502

(56) References Cited

U.S. PATENT DOCUMENTS

| | | | |
|---|---|---|---|
| 2002/0072994 A1* | 6/2002 | Mori | G06Q 10/00 705/7.11 |
| 2004/0044690 A1* | 3/2004 | Kanzinger | G06Q 10/107 |
| 2004/0153379 A1* | 8/2004 | Joyce | G06Q 10/08 705/28 |
| 2007/0279222 A1* | 12/2007 | Carrigan | A47G 29/1201 340/540 |
| 2008/0040133 A1* | 2/2008 | Foth | G06Q 10/08 705/338 |
| 2008/0306884 A1* | 12/2008 | Weinberg | B42D 15/02 705/410 |
| 2010/0274610 A1* | 10/2010 | Andersen | G06Q 10/087 705/28 |
| 2012/0029967 A1 | 2/2012 | Kukreja et al. | |
| 2012/0047012 A1* | 2/2012 | Pedersen | G06Q 30/02 705/14.49 |
| 2012/0072363 A1* | 3/2012 | Spiegel | G06Q 10/08 705/336 |
| 2012/0089533 A1* | 4/2012 | Klingenberg | G06Q 10/08 705/332 |
| 2014/0063311 A1* | 3/2014 | McCauley | H04N 1/00137 348/333.01 |
| 2015/0242918 A1* | 8/2015 | McCarthy | G06Q 30/0617 705/26.43 |
| 2017/0061367 A1* | 3/2017 | Zhang | G06Q 10/083 |

FOREIGN PATENT DOCUMENTS

| | | |
|---|---|---|
| CN | 101263516 A | 9/2008 |
| CN | 102346880 A | 2/2012 |
| CN | 102567900 A | 7/2012 |
| CN | 102902691 A | 1/2013 |
| WO | 9922328 A1 | 5/1999 |
| WO | 0014648 A1 | 3/2000 |

OTHER PUBLICATIONS

Foreign Communication From a Counterpart Application, PCT Application No. PCT/CN2015/071644, English Translation of Written Opinion dated May 4, 2015, 6 pages.

\* cited by examiner

DATA PROCESSING SYSTEM AND METHOD

CROSS-REFERENCE TO RELATED APPLICATIONS

This application is a continuation of International Application No. PCT/CN2015/071644, filed on Jan. 27, 2015, which claims priority to Chinese Patent Application No. 201410205427.5, filed on May 15, 2014, both of which are hereby incorporated by reference in their entireties.

TECHNICAL FIELD

The present disclosure relates to the field of data processing, and in particular, to a data processing system and method.

BACKGROUND

In recent years, online shopping has become one of shopping means commonly used by users. Compared with brick-and-mortar shopping, online shopping allows a buyer to "go shopping" at home, where ordered goods are not limited by time and location, to obtain a large amount of commodity information, and purchase commodities from a larger range of area, and not necessarily to go in person from ordering goods, purchasing goods, to delivering goods, which is time-saving and energy-saving.

Online shopping is to search for commodity information on the Internet, send a shopping request using an electronic purchase order, and then fill in a personal check account number or a credit card number. A vendor delivers the goods by mail, or makes home delivery by an express service company.

Currently, a commonly-used online shopping manner is that a buyer places an electronic order, and then a seller delivers, according to the order, a commodity purchased by the buyer to the buyer by mail or by express delivery. Under usual conditions, after ordering a commodity, a buyer needs to wait for a period of commodity mailing time, and cannot immediately get the commodity after the buyer purchases the commodity. Expedited transportation shortens a period of time that a buyer waits for arrival of a commodity, but the buyer needs to pay for an extra expense, and still needs to wait a period of time for transmission of the commodity.

It can be learned that the online shopping processing manner in the prior art causes a long article circulation time, thereby resulting in problems such as poor user experience.

SUMMARY

The present disclosure provides a data processing system and method. The method and apparatus provided in the present disclosure resolve problems such as poor user experience caused by a long article circulation time due to the online shopping processing manner in the prior art.

According to a first aspect, a data processing system is provided, including a first data processing device that generates commodity delivery information, and a second data processing device that provides a commodity delivery person with the commodity delivery information, where the first data processing device configured to determine, according to historical information of users, multiple target users that potentially will purchase a specific commodity, and acquire multiple pieces of address information that correspond to the multiple target users, combine the multiple pieces of address information to form one piece of commodity delivery information, and send the commodity delivery information to the second data processing device, and the second data processing device configured to receive the commodity delivery information, and process the commodity delivery information such that the commodity delivery person delivers the specific commodity to at least one of the multiple target users according to one or more of the multiple pieces of address information included in the commodity delivery information.

With reference to the first aspect, in a first possible implementation manner, the first data processing device is further configured to determine that multiple users, within a range of a set geographical area that potentially will purchase the specific commodity are the target users.

With reference to the first possible implementation manner of the first aspect, in a second possible implementation manner, the first data processing device is further configured to determine whether a quantity of the users, within the range of the set geographical area, that potentially will purchase the specific commodity is greater than a first threshold, and if yes, determine that the multiple users, within the range of the set geographical area, that potentially will purchase the specific commodity are the target users.

With reference to the first aspect or either one of the first to the second possible implementation manners of the first aspect, in a third possible implementation manner, the first data processing device is configured to determine, according to one or a combination of multiple of user transaction data information, commodity logistics data information, environment data information, and user social data information that are in the historical information, the multiple target users that potentially will purchase the specific commodity.

With reference to the first aspect or any one of the first to the third possible implementation manners of the first aspect, in a fourth possible implementation manner, the first data processing device is further configured to set a delivery order for the acquired multiple pieces of address information according to a preset parameter.

With reference to the fourth possible implementation manner of the first aspect, in a fifth possible implementation manner, the first data processing device is configured to set the delivery order for the acquired multiple pieces of address information according to one or a combination of multiple of a distance parameter between a receiving location of a target user and a sending location of the specific commodity, an importance parameter of the target user, and an urgency parameter of a requirement of the target user for the specific commodity.

With reference to the first aspect or any one of the first to the fifth possible implementation manners of the first aspect, in a sixth possible implementation manner, after the commodity is delivered to one corresponding address of the multiple pieces of address information, the first data processing device is further configured to receive feedback information that is sent by the second data processing device for a delivery status of the specific commodity, and push newly-added information of the specific commodity to the second data processing device according to the feedback information.

With reference to the sixth possible implementation manner of the first aspect, in a seventh possible implementation manner, the first data processing device is further configured to set, in the newly-added information according to the feedback information, discount information and promotion information for the specific commodity.

With reference to the first aspect or any one of the first to the seventh possible implementation manners of the first aspect, in an eighth possible implementation manner, during the delivery of the specific commodity, when the first data processing device receives ordering information of an ordering user, the first data processing device is further configured to determine, according to the ordering information, whether a distance between a geographical location of the ordering user and a current location of the specific commodity is less than a second threshold, and if yes, generate a first adjustment instruction according to an address of the ordering user, and send the first adjustment instruction to the second data processing device, and the second data processing device is further configured to process the first adjustment instruction such that the commodity delivery person delivers, according to the first adjustment instruction, the specific commodity from the current location to the geographical location that corresponds to the address of the ordering user.

With reference to the first aspect or any one of the first to the sixth possible implementation manners of the first aspect, in a ninth possible implementation manner, the first data processing device is further configured to add a default address to the commodity delivery information, and the first data processing device is further configured to determine, in the multiple pieces of address information, a target address to which the specific commodity is last delivered, determine, according to the target address, an address of a store capable of selling the specific commodity, update the default address as the store address, and send a second adjustment instruction to the second data processing device, and the second data processing device is further configured to process the second adjustment instruction such that the commodity delivery person delivers, according to the second adjustment instruction, the specific commodity to the store that corresponds to the store address.

With reference to the first aspect or any one of the first to the sixth possible implementation manners of the first aspect, in a tenth possible implementation manner, the first data processing device is further configured to calculate the historical information of the users using a weighting calculation method and/or a similarity calculation method, to determine the multiple target users that potentially will purchase the specific commodity.

According to a second aspect, a data processing method is provided, where the method is applied to a data processing system, and the data processing system includes a first data processing device that generates commodity delivery information, and a second data processing device that provides a commodity delivery person with the commodity delivery information, where the method includes determining, by the first data processing device according to historical information of users, multiple target users that potentially will purchase a specific commodity, and acquiring multiple pieces of address information that correspond to the multiple target users, and combining the multiple pieces of address information to form one piece of commodity delivery information, and sending, by the first data processing device, the commodity delivery information to the second data processing device that provides the commodity delivery person with the commodity delivery information such that the second data processing device processes the commodity delivery information, and the commodity delivery person can deliver the specific commodity to at least one of the multiple target users according to one or more of the multiple pieces of address information included in the commodity delivery information processed by the second data processing device.

With reference to the second aspect, in a first possible implementation manner, the determining, according to historical information of users, multiple target users that potentially will purchase a specific commodity includes determining, by the first data processing device according to the historical information of the users, multiple users, within a range of a set geographical area, that potentially will purchase the specific commodity, and determining that the multiple users are the target users.

With reference to the first possible implementation manner of the second aspect, in a second possible implementation manner, before the determining that the multiple users are the target users, the method further includes determining, by the first data processing device, whether a quantity of the users, within the range of the set geographical area, that potentially will purchase the specific commodity is greater than a first threshold, and if yes, determining that the multiple users are the target users.

With reference to the second aspect or either one of the first to the second possible implementation manners of the second aspect, in a third possible implementation manner, the historical information includes one or a combination of multiple of user transaction data information, commodity logistics data information, environment data information, and user social data information.

With reference to the second aspect or any one of the first to the third possible implementation manners of the second aspect, in a fourth possible implementation manner, the combining the multiple pieces of address information to form one piece of commodity delivery information includes setting, by the first data processing device, a delivery order for the acquired multiple pieces of address information according to a preset parameter, and combining, according to the delivery order, the multiple pieces of address information to form one piece of commodity delivery information.

With reference to the fourth possible implementation manner of the second aspect, in a fifth possible implementation manner, the setting, by the first data processing device, a delivery order for the acquired multiple pieces of address information according to a preset parameter includes setting, by the first data processing device, the delivery order for the multiple pieces of address information according to one or a combination of multiple of a distance parameter between a receiving location of a target user and a sending location of the specific commodity, an importance parameter of the target user, and an urgency parameter of a requirement of the target user for the specific commodity.

With reference to the second aspect or any one of the first to the fifth possible implementation manners of the second aspect, in a sixth possible implementation manner, after the commodity is delivered to one corresponding address of the multiple pieces of address information, the method further includes receiving, by the first data processing device, feedback information that is sent by the second data processing device for a delivery status of the specific commodity, and pushing newly-added information of the specific commodity to the second data processing device according to the feedback information.

With reference to the sixth possible implementation manner of the second aspect, in a seventh possible implementation manner, the first data processing device sets, in the newly-added information according to the feedback information, discount information and promotion information for the specific commodity.

With reference to the second aspect or any one of the first to the seventh possible implementation manners of the second aspect, in an eighth possible implementation manner, after the combining the multiple pieces of address information to form one piece of commodity delivery information, and sending the commodity delivery information to the second data processing device, the method further includes during the delivery of the specific commodity, when the first data processing device receives ordering information of an ordering user, determining, by the first data processing device according to the ordering information, whether a distance between a geographical location of the ordering user and a current location of the specific commodity is less than a second threshold, and if yes, generating a first adjustment instruction according to an address of the ordering user, and sending the first adjustment instruction to the second data processing device such that the commodity delivery person delivers, according to the first adjustment instruction, the specific commodity from the current location to the geographical location that corresponds to the address of the ordering user.

With reference to the second aspect or any one of the first to the sixth possible implementation manners of the second aspect, in a ninth possible implementation manner, before the combining the multiple pieces of address information to form one piece of commodity delivery information, and sending the commodity delivery information to the second data processing device, the method further includes determining, by the first data processing device in the multiple pieces of address information, a target address to which the specific commodity is last delivered, determining, according to the target address, an address of a store capable of selling the specific commodity, updating the default address as the store address, and sending a second adjustment instruction to the second data processing device such that the commodity delivery person delivers, according to the second adjustment instruction, the specific commodity to the store that corresponds to the store address.

With reference to the second aspect or any one of the first to the sixth possible implementation manner of the second aspect, in a tenth possible implementation manner, the determining, according to historical information of users, multiple target users that potentially will purchase a specific commodity includes calculating, by the first data processing device, the historical information of the users using a weighting calculation method and/or a similarity calculation method, to determine the multiple target users that potentially will purchase the specific commodity.

According to a third aspect, a data processing device is provided, where the data processing device generates commodity delivery information, the data processing device can exchange data with a second data processing device, the second data processing device provides a commodity delivery person with the commodity delivery information, and the data processing device includes a target determining unit configured to determine, according to historical information of users, multiple target users that potentially will purchase a specific commodity, a distribution information generating unit configured to acquire multiple pieces of address information that correspond to the multiple target users, and combine the multiple pieces of address information to form one piece of commodity delivery information, and a sending unit configured to send the commodity delivery information to the second data processing device that provides the commodity delivery person with the commodity delivery information such that the second data processing device processes the commodity delivery information, and the commodity delivery person can deliver the specific commodity to at least one of the multiple target users according to one or more of the multiple pieces of address information included in the commodity delivery information processed by the second data processing device.

With reference to the third aspect, in a first possible implementation manner, the target determining unit is further configured to determine whether a quantity of the users, within a range of a set geographical area, that potentially will purchase the specific commodity is greater than a first threshold, and if yes, determine that the multiple users, within the range of the set geographical area, that potentially will purchase the specific commodity are the target users.

With reference to the third aspect, in a second possible implementation manner, the distribution information generating unit is further configured to set a delivery order for the acquired multiple pieces of address information according to a preset parameter.

With reference to the third aspect, in a third possible implementation manner, after the commodity is delivered to one corresponding address of the multiple pieces of address information, the data processing device further includes a first adjustment unit configured to receive feedback information that is sent by the second data processing device for a delivery status of the specific commodity, and push newly-added information of the specific commodity to the second data processing device according to the feedback information.

With reference to the third aspect, in a fourth possible implementation manner, the data processing device further includes a second adjustment unit configured to, before the multiple pieces of address information are combined to form one piece of commodity delivery information, and the commodity delivery information is sent to the second data processing device, determine, in the multiple pieces of address information, a target address to which the specific commodity is last delivered, determine, according to the target address, an address of a store capable of selling the specific commodity, update the default address as the store address, and send a second adjustment instruction to the second data processing device such that the commodity delivery person delivers, according to the second adjustment instruction, the specific commodity to the store that corresponds to the store address.

One or two of the foregoing technical solutions have at least the following technical effects:

In the solutions provided in embodiments of the present disclosure, multiple users that currently may need to purchase a commodity are predicted according to historical data of the users. Before a user places an order, a predicted commodity is packaged and delivered to the multiple users, thereby reducing a period of time that the user waits for arrival of the commodity.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1A:
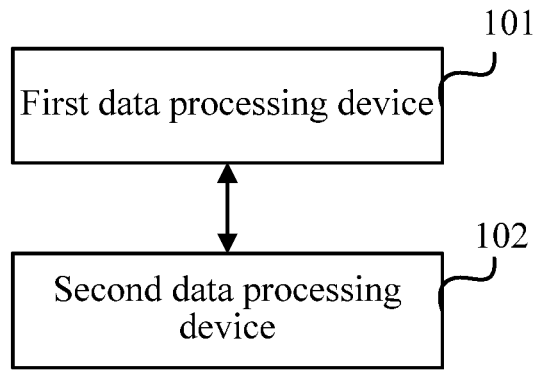
FIG. 1A is a schematic structural diagram of a data processing system according to Embodiment 1 of the present disclosure.

As shown in FIG. 1A, the present disclosure provides a data processing system, where the data processing system includes a first data processing device 101 that generates commodity delivery information, and a second data processing device 102 that provides a commodity delivery person with the commodity delivery information A solution provided in this embodiment of the present disclosure is that before a user orders a commodity, prediction is performed in advance according to historical information of the user, and if it is predicted that the user will purchase a commodity, the commodity is delivered directly, thereby achieving an effect of reducing time delay of electronic shopping to the greatest extent.

The first data processing device 101 is configured to determine, according to historical information of users, multiple target users that may potentially purchase a specific commodity, and acquire multiple pieces of address information that correspond to the multiple target users, combine the multiple pieces of address information to form one piece of commodity delivery information, and send the commodity delivery information to the second data processing device.

In this embodiment of the present disclosure, the first data processing device 101 may be disposed in a fulfillment center, and the fulfillment center may send, to a supplier, an analysis result that is obtained through analysis according to the historical information such that the supplier then transports the commodity to a customer according to the analysis result. In addition, the first data processing device 101 may alternatively be deployed in the supplier, and the supplier predicts, according to historical information that is stored in the supplier or historical information that is acquired on the Internet, the multiple target users that potentially will purchase the specific commodity.

To more accurately predict the users that potentially will purchase the specific commodity, the historical information of the users mentioned in this embodiment of the present disclosure may be big data information of the users that is acquired on the Internet (the big data information may be user-related information and commodity-related information from an electronic-commerce (e-commerce) portal, a physical store, a social network, an external environment database, and a user personal information database), and commodity information, such as a time at which a commodity is needed, a brand, or a quantity, that may be needed by the users are analyzed and predicted according to the acquired big data information of the users. After specific commodities that are needed by the users are determined, delivery addresses are configured for these specific commodities, where the delivery addresses include information about multiple requiring users.

To accurately analyze the users that potentially will purchase the specific commodity, the first data processing device 101 is further configured to determine, according to one or a combination of multiple of user transaction data information, commodity logistics data information, environment data information, and user social data information that are in the historical information, the multiple target users that potentially will purchase the specific commodity.

When determining the target users, the first data processing device 101 may process historical data using some specific algorithms, to determine the target users. Therefore, the first data processing device 101 is further configured to calculate the historical information of the users using a weighting calculation method and/or a similarity calculation method, to determine the multiple target users that potentially will purchase the specific commodity.

The second data processing device 102 is configured to receive the commodity delivery information, and process the commodity delivery information such that the commodity delivery person delivers the specific commodity to at least one of the multiple target users according to one or more of the multiple pieces of address information included in the commodity delivery information.

In this embodiment of the present disclosure, the second data processing device may also be disposed in the fulfillment center, and the second data processing device that is disposed in the fulfillment center may categorize, according to commodity delivery information obtained through analysis, commodities provided by a supplier, or forward the commodities to a delivery party for delivery. In addition, the second data processing device may alternatively be disposed in the delivery party, and, the second data processing device may be disposed in a server device of the delivery part, or may be disposed in a handheld mobile device terminal of a commodity delivery person. In this case, after determining a user to whom delivery needs to be made and a specific commodity, the supplier of the commodities or the fulfillment center may send the commodity delivery information to the second data processing device that is disposed in the delivery party, then the second data processing device processes or directly outputs the commodity delivery information such that a delivery person that delivers the specific commodity can deliver the commodity to the corresponding user according to the delivery information.

In a specific application environment, if multiple users regularly purchase a commodity a, a feature of the commodity a that is regularly purchased by the multiple users may be obtained, through analysis according to historical data of the users, from tens of thousands of users that purchase the commodity, the first data processing device may send a result of the analysis (that is, the commodity delivery information in this embodiment of the present disclosure) to the second data processing device, and then the second data processing device may process the analysis result in the simplest processing manner, directly outputting the analysis result. Then the commodity delivery person may deliver the specific commodity according to addresses of the multiple users that are included in the analysis result. During specific delivery, if the first user does not receive the specific commodity, the specific commodity is delivered to the second user, and the like, until a user purchases the specific commodity, or the specific commodity is delivered to a preset organization that receives the specific commodity.

To deliver, at the highest speed and through the shortest path, the specific commodity to a location of the user that purchases the specific commodity, in a solution provided in this embodiment of the present disclosure, the first data processing device is further configured to perform the following operations First, if a commodity is delivered, corresponding delivery costs are incurred, and there may be a risk of damage caused during the delivery of the commodity. Therefore, when a user to whom the commodity is delivered is selected, operations that need to be performed by the first data processing device include that to shorten the delivery path, when the users that potentially will purchase the specific commodity are selected, the first data processing device 101 is further configured to determine that the multiple users, within a range of a set geographical area, that potentially will purchase the specific commodity are the target users.

After analyzing the historical data of the users, when finding that there are many users that potentially will purchase a commodity, the first data processing device may determine that multiple users, within the range of the set geographical area that potentially will purchase the specific commodity are the target users. After the users within the range of the set geographical area are selected as the target users that will purchase the specific commodity, time of commodity delivery may be shortened to the greatest extent, and a path of the commodity delivery can also achieve an effect of being the shortest.

In addition, because there is an enough quantity of users, within the range of the set geographical area, that potentially will purchase the specific commodity, it can be ensured to the greatest extent that after the commodity is delivered according to predicted information, the commodity can be received by a user, therefore, in this embodiment of the present disclosure the first data processing device 101 is further configured to determine whether a quantity of the users, within the range of the set geographical area, that potentially will purchase the specific commodity is greater than a first threshold, and if yes, determine that the multiple users, within the range of the set geographical area, that potentially will purchase the specific commodity are the target users.

Second, in the solution provided in this embodiment of the present disclosure, multiple users that potentially will purchase the specific commodity are determined at one time, but the specific commodity can be delivered to only one address at each time during the delivery of the specific commodity. Therefore, an implementation manner of delivering at the highest speed the specific commodity to a user that needs the commodity the most may be that the first data processing device 101 is further configured to set a delivery order for the acquired multiple pieces of address information according to a preset parameter.

A manner of determining the delivery order according to the preset parameter may be that the first data processing device 101 is further configured to set the delivery order for the acquired multiple pieces of address information according to one or a combination of multiple of a distance parameter between a receiving location of a target user and a sending location of the specific commodity, an importance parameter of the target user, and an urgency parameter of a requirement of the target user for the specific commodity.

In a specific application environment, the delivery order (that is, delivery priorities) of multiple addresses may be determined in multiple manners, which may be:

For example, priorities may be arranged according to an order of distances of recipient addresses of users, to reduce delivery of finished products, or prediction may be performed according to importance of the users, where for example, a priority of a very important person (VIP) user or a user with high credibility is high, or priorities may be arranged according to predicted urgency or time of a requirement of the users for these commodities, and priority is given to an urgent requirement; last, priorities may be determined according to a quantity of times that a user rejects a pushed parcel, and a priority of a user who rejects for many times is set to be low.

Further, in this embodiment of the present disclosure, because the user does not submit specific ordering information when the commodity is delivered, even though multiple recipient addresses are configured for the commodity parcel, once rejected, the commodity cannot be returned to an upper level address of the geographical area or another geographical area, however, delivery within a same geographical area also has transportation costs. Therefore, to reduce transportation costs, and shorten a delivery path, in the solution provided in this embodiment of the present disclosure, after the commodity is delivered to one corresponding address of the multiple pieces of address information, the first data processing device 101 is further configured to receive feedback information that is sent by the second data processing device 102 for a delivery status of the specific commodity, and push newly-added information of the specific commodity to the second data processing device according to the feedback information.

The first data processing device 101 is further configured to set, in the newly-added information according to the feedback information, discount information and promotion information for the specific commodity.

The promotion information is special offer information that is provided by a merchant and may raise a desire of a user to purchase the specific commodity. For example, the promotion information may be that a related commodity may be given as a gift if the specific commodity is purchased, or the like.

In this embodiment of the present disclosure, when a commodity is delivered from a supplier, no corresponding target users request ordering of the commodity. During implementation of a specific delivery operation, to achieve the optimal delivery effect, a delivery rule is that a user that has made an order request has the highest priority. Therefore, when the first data device receives an order request of a user, and a distance between an address of the ordering user and an address of the commodity that has been delivered is less than a set threshold, a priority of the ordering user may be set to be the highest according to the delivery rule, and therefore, the first data processing device 101 is further configured to change a delivery path of the specific commodity such that the specific commodity is delivered to the ordering user, and the specific implementation further includes, during the delivery of the specific commodity, when the first data processing device 101 receives ordering information of an ordering user, and determine, according to the ordering information, whether a distance between a geographical location of the ordering user and a current location of the specific commodity is less than a second threshold, if yes, generating a first adjustment instruction according to an address of the ordering user, and sending the first adjustment instruction to the second data processing device 102, where the second data processing device 102 is further configured to process the first adjustment instruction such that the commodity delivery person delivers, according to the first adjustment instruction, the specific commodity from the current location to the geographical location that corresponds to the address of the ordering user.

In this embodiment, during the delivery of the specific commodity that is predicted to be delivered, if the first data processing device 101 receives an order of a user A for the specific commodity, but an address corresponding to the user A is not a next delivery address of the specific commodity, to meet a requirement of the user to the greatest extent, the specific commodity that is on the way of the delivery may be directly delivered to the user A. Therefore, after determining specific locations of the user A and the specific commodity, the first data processing device 101 sends a first adjustment instruction to the second data processing device 102, where the first adjustment instruction may be the address of the user A such that a corresponding delivery person can deliver the specific commodity to the user A according to the first adjustment instruction.

Further, although multiple target users are determined, and a corresponding policy is provided to enable the multiple target users to purchase the specific commodity, for uncertainty of the prediction, there may still be a possibility that no user receive the specific commodity after the specific commodity is delivered to all users. To resolve the foregoing problem and reduce costs of the delivery to the lowest, in the solution provided in this embodiment of the present disclosure, the first data processing device 101 is further configured to add a default address to the commodity delivery information, and the solution includes the first data processing device 101 determines, in the multiple pieces of address information, a target address to which the specific commodity is last delivered, determines, according to the target address, an address of a store capable of selling the specific commodity, updates the default address as the store address, and sends a second adjustment instruction to the second data processing device 102, and the second data processing device 102 is further configured to process the second adjustment instruction such that the commodity delivery person delivers, according to the second adjustment instruction, the specific commodity to the store that corresponds to the store address.

Figure 1B:
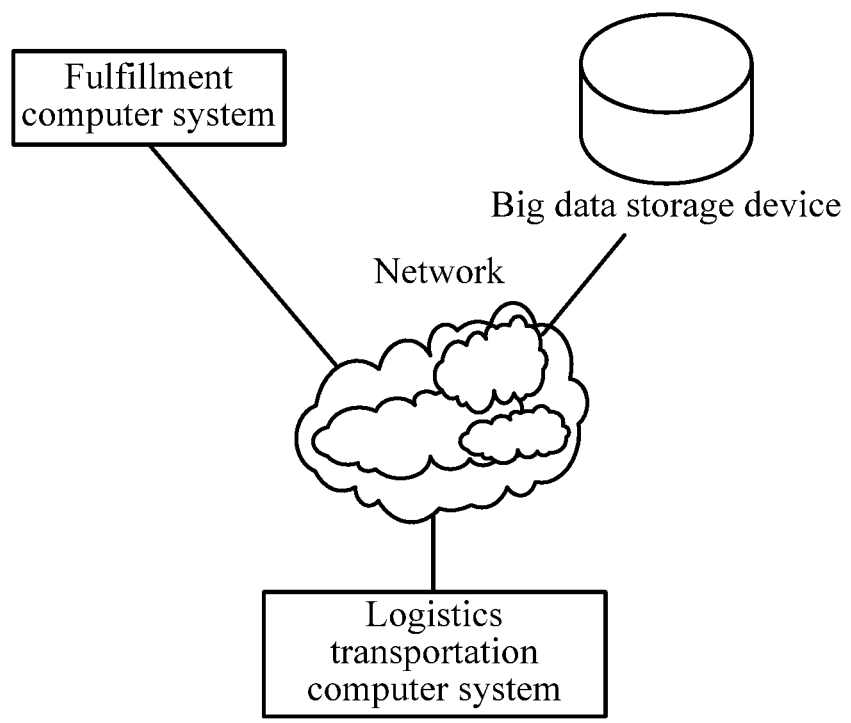
FIG. 1B is an optional schematic structural diagram of a data processing system in an actual application according to Embodiment 1 of the present disclosure.

In an actual application environment, the system provided in this embodiment of the present disclosure may be of a structure shown in FIG. 1B. If the system provided in this embodiment of the present disclosure is applied to a logistics transportation computer system and a fulfillment computer system in a logistics transportation system, the first data processing device may be disposed in the fulfillment computer system, and the second data processing device may be disposed in the logistics transportation computer system. In addition, the fulfillment computer system may exchange data with the logistics transportation computer system using a wireless/wired network.

Further, to accurately analyze a purchase intention of a user, data related to the user needs to be acquired as much as possible, and therefore, the fulfillment computer system may further be connected to a big data storage device using a network. The big data storage device stores a large amount of data, such as e-commerce portal data, location information data of a physical store, social network data, external environment data, or user personal information data, that is related to the user and the commodity Embodiment 2

Figure 2:
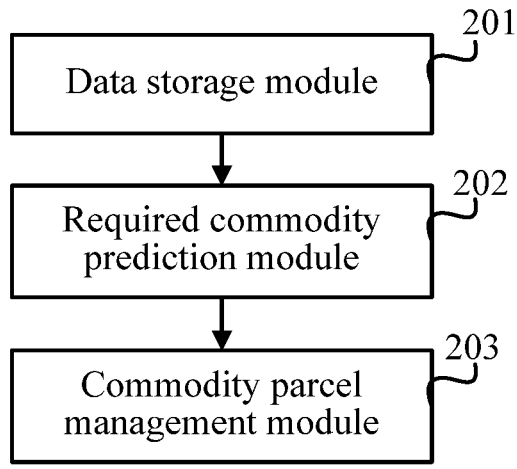
FIG. 2 is a schematic structural diagram of a first data processing device according to Embodiment 2 of the present disclosure.

In this embodiment of the present disclosure, when the first data processing device is disposed in a fulfillment computer system, a specific structure of the first data processing device may be shown in FIG. 2, which includes:

A data storage module 201 is configured to save big data information that is found on the Internet, related to a user and a commodity, and used to collect statistics about and predict a commodity that is required by the user.

Data related to a user and a commodity may include user and commodity information from an e-commerce portal, such as a transaction record, or a browsing history record, user and commodity information from a physical store, including a transaction record, user questionnaire information, market research information, a commodity database, or the like, user social and interest information from a social network, information about an environment in which each user is located that is stored in an external environment database, such as a city in which a user is located, or the weather of the city, or user personal information from a user personal information database, such as an itinerary, a calendar, or a memo of the user.

A required commodity prediction module 202 is configured to predict, according to various types of found big data information in the data storage module, a potential requirement of the user for the commodity, and a required time. According to a quantity of potential users of the commodity, locations of the users, and times when these users need the commodity.

A commodity parcel management module 203 is configured to determine, according to commodities, for which there is a potential requirement, that are predicted by the required commodity prediction module 202, and information about users that have a requirement for the commodities, commodities that should be packaged and delivered, configure, for each parcel, delivery addresses and a priority order of multiple requiring users, and configure one sales store address, which is used when none of the users receive the parcel. To reduce logistics costs, addresses of requiring users that are located in a same geographical area and addresses of sales stores that are located in the same geographical area are configured in one parcel.

Figure 3:
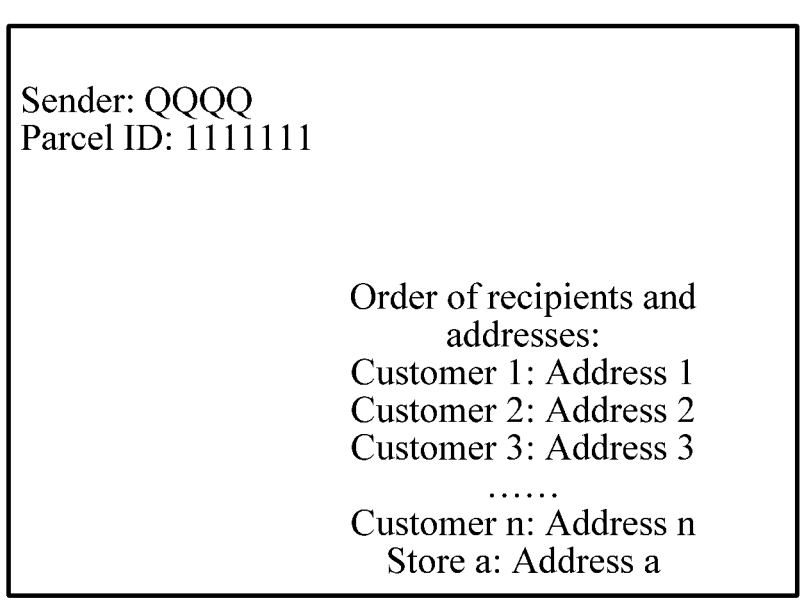
FIG. 3 is a schematic diagram of configuration information of a recipient address of a commodity parcel in Embodiment 2 of the present disclosure.

In an embodiment, configuration information of a recipient address of a commodity parcel is shown in FIG. 3, and information about multiple users may be configured in the commodity parcel, including sender information, a parcel identification (ID), and an order and addresses of multiple receivers. The multiple receivers include addresses of customers, within a same geographical area, that all have a potential requirement for the commodity parcel, and addresses of stores capable of selling the commodity.

In an embodiment, to protect privacy of the users, the addresses of all the receivers may not necessarily be displayed on the commodity parcel, and a fulfillment computer system may notify a logistics transportation computer system of a list of recipient addresses and a priority order that correspond to the parcel, and when the users reject the parcel, the transportation computer system configures a new address for the commodity parcel according to an address list record such that the commodity parcel may be delivered from a logistics center of the closest geographical area to a next user address.

Embodiment 3

Figure 4:
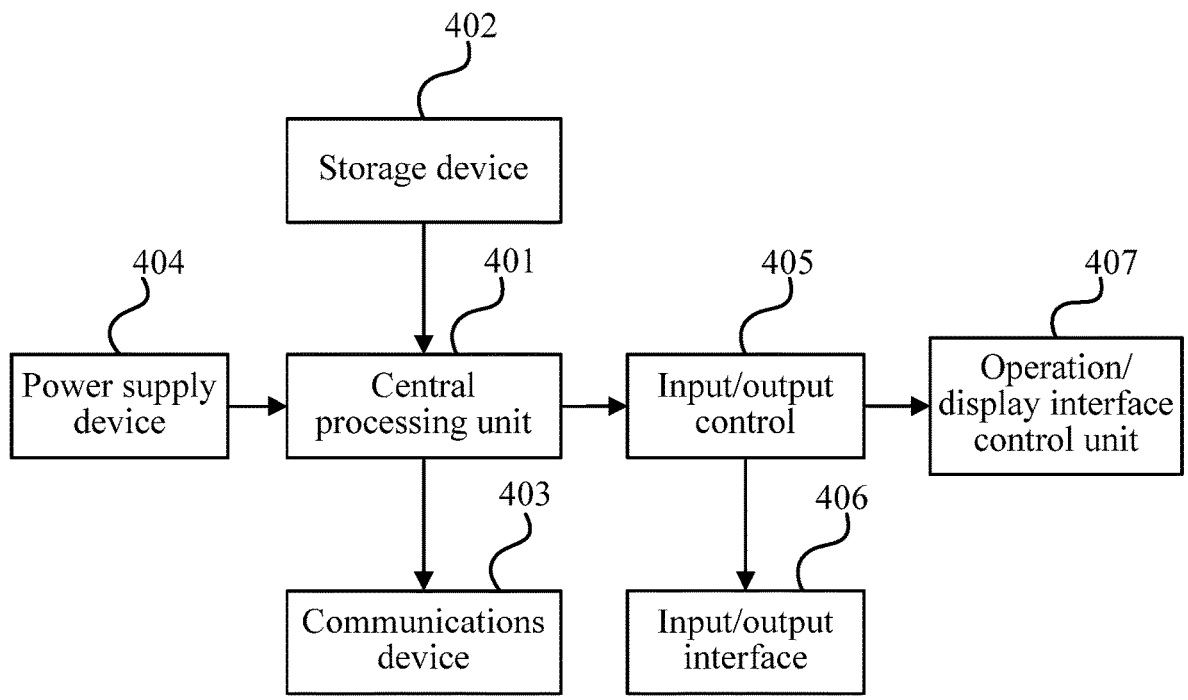
FIG. 4 is a schematic structural diagram of a fulfillment computer system according to Embodiment 3 of the present disclosure.

Based on the foregoing implementation process of a fulfillment system, a fulfillment computer system further provided in the present disclosure may be a computer, or may be a computer system that includes multiple computers and servers. A specific physical structure may be shown in FIG. 4, which includes:

A central processing unit 401 is configured to control hardware devices of the entire fulfillment computer system, and run operating system software and required application program software, where functions of software such as data storage module management software, user required commodity prediction software, commodity parcel management software, and administrator user interface (UI) operation interface involved in the present disclosure are all run in the central processing unit 401, used to implement functions of a required commodity prediction module 202 and a commodity parcel management module 203 in a structure shown in FIG. 2.

A storage device 402 is configured to implement storage of various software programs, storage of data, and running of software, and the like of the fulfillment computer system, and may be one or more of a solid-state disk (SSD), a hard disk (HD), and the like, and related functions of user commodity prediction and delivery software provided in the present disclosure are also run and stored in the storage device 402.

A communications device 403 is configured to provide the fulfillment computer system with a network communications function, including one or more of wired transmission, optical transmission, and the like.

A power supply device 404 is configured to supply power for the fulfillment computer system.

An input/output (I/O) control 405 is configured to control data exchange between various input/output devices in the fulfillment computer system.

An I/O interface 406 is an external interface provided in the fulfillment computer system, including one or more of a serial port, a network port, or the like.

An operation/display interface control unit 407 is configured for an operation/display interface of a graphical user interface (GUI) provided in the fulfillment computer system, and displays a running status, a device status, a user operating interface, and an operation result of the fulfillment computer system.

In an embodiment, to improve performance of the computer system, the computer system may also include multiple computers or servers, or the computer system may by formed in a manner of a distributed system, or the computer system may be established in a manner of processor pooling, memory pooling, or I/O pooling.

In a solution provided in this embodiment of the present disclosure, multiple users that currently may need to purchase a commodity are predicted according to historical data of the users. Before a user places an order, a predicted commodity is packaged and delivered to multiple users. To reduce an error rate of prediction, multiple users that have a potential requirement are predicted for a commodity that is to be delivered, and recipient addresses of the multiple requiring users, a default sales store address, and a delivery order are configured for the commodity parcel, thereby effectively reducing a delay caused by logistics during electronic shopping.

In addition, addresses of target users and an address of a sales store that are selected in this embodiment of the present disclosure are all located in a same geographical area, thereby reducing logistics costs to the greatest extent.

Embodiment 4

Figure 5:
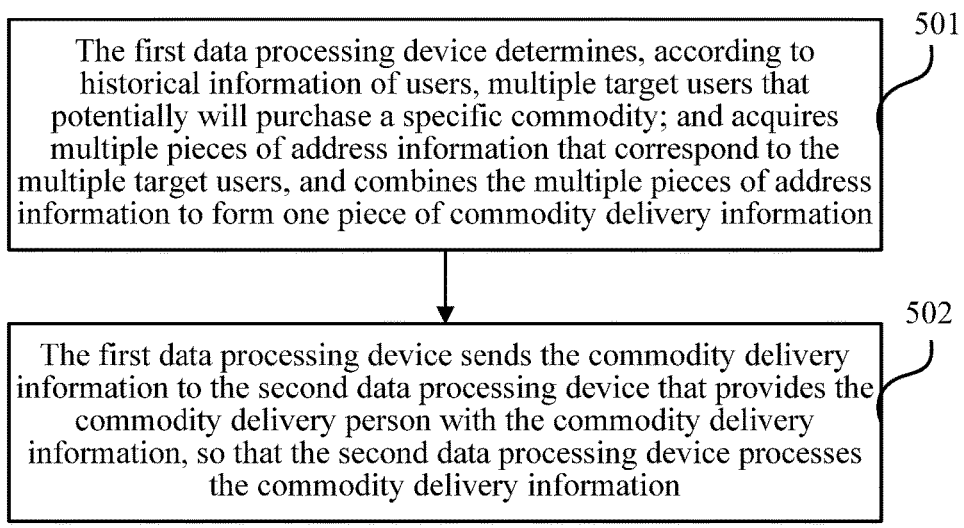
FIG. 5 is a schematic flowchart of a data processing method according to Embodiment 4 of the present disclosure.

As shown in FIG. 5, this embodiment of the present disclosure further provides a data processing method, where the method is applied to a data processing system, and the data processing system includes a first data processing device that generates commodity delivery information, and a second data processing device that provides a commodity delivery person with the commodity delivery information, including the following steps.

Step 501: The first data processing device determines, according to historical information of users, multiple target users that potentially will purchase a specific commodity, and acquires multiple pieces of address information that correspond to the multiple target users, and combines the multiple pieces of address information to form one piece of commodity delivery information.

The historical information includes one or a combination of multiple of user transaction data information, commodity logistics data information, environment data information, and user social data information.

To deliver the commodity through an optimized path, a manner of combining the multiple pieces of address information to form one piece of commodity delivery information may be:

A: The first data processing device sets a delivery order for the acquired multiple pieces of address information according to a preset parameter.

That the first data processing device sets a delivery order for the acquired multiple pieces of address information according to a preset parameter includes setting, by the first data processing device, the delivery order for the multiple pieces of address information according to one or a combination of multiple of a distance parameter between a receiving location of a target user and a sending location of the specific commodity, an importance parameter of the target user, and an urgency parameter of a requirement of the target user for the specific commodity.

B: Combine, according to the delivery order, the multiple pieces of address information to form one piece of commodity delivery information.

Step 502: The first data processing device sends the commodity delivery information to the second data processing device that provides the commodity delivery person with the commodity delivery information such that the second data processing device processes the commodity delivery information, and the commodity delivery person can deliver the specific commodity to at least one of the multiple target users according to one or more of the multiple pieces of address information included in the commodity delivery information processed by the second data processing device.

Because there are many users that purchase a commodity, and there are a large quantity of commodities, in this embodiment of the present disclosure, determining, according to historical information of users, multiple target users that potentially will purchase a specific commodity includes calculating, by the first data processing device, the historical information of the users using a weighting calculation method and/or a similarity calculation method, to determine the multiple target users that potentially will purchase the specific commodity.

In addition, to shorten a delivery path and reduce logistics costs, that the first data processing device determines, according to the historical information of the users, the multiple target users that potentially will purchase the specific commodity includes determining, by the first data processing device according to the historical information of the users, multiple users, within a range of a set geographical area, that potentially will purchase the specific commodity, and determining that the multiple users are the target users.

Before determining that the multiple users are the target users, the method further includes determining, by the first data processing device, whether a quantity of the users, within the range of the set geographical area, that potentially will purchase the specific commodity is greater than a first threshold, and if yes, determining that the multiple users are the target users.

Further, in this embodiment of the present disclosure, because the user does not submit specific ordering information when the commodity is delivered, even though multiple recipient addresses are configured for the commodity parcel, once rejected, the commodity cannot be returned to an upper level address of the geographical area or another geographical area, however, delivery within a same geographical area also has transportation costs. Therefore, to reduce transportation costs, and shorten a delivery path, in the solution provided in this embodiment of the present disclosure after the commodity is delivered to one corresponding address of the multiple pieces of address information, the method further includes receiving, by the first data processing device, feedback information that is sent by the second data processing device for a delivery status of the specific commodity, and pushing newly-added information of the specific commodity to the second data processing device according to the feedback information.

The first data processing device sets, in the newly-added information according to the feedback information, discount information and promotion information for the specific commodity.

Figure 6:
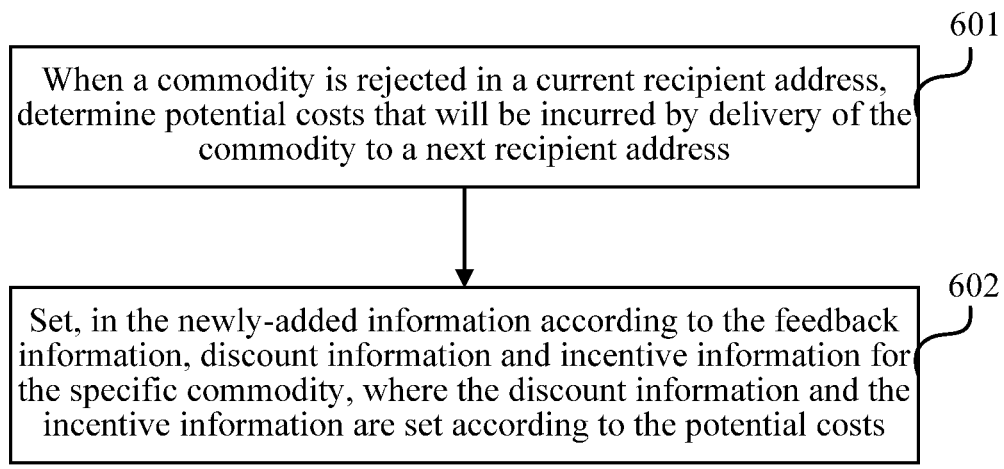
FIG. 6 is a schematic flowchart of a method for determining discount information and promotion information for the specific commodity in the method according to Embodiment 4 of the present disclosure.

In this embodiment, a specific implementation method for determining the discount information and the promotion information for the specific commodity may be (a method process is shown in FIG. 6):

Step 601: When a commodity is rejected in a current recipient address, determine potential costs that will be incurred by delivery of the commodity to a next recipient address.

The potential costs may include a transportation cost, a temporary transfer cost, a labor cost, and the like. For example, because a commodity has a validity period or a shelf life, the potential costs may be increased. If a buyer requires the commodity to be sold within a specific period of time because of a sales promotion policy or a brand sales promotion policy, the potential costs may be properly increased according to a stay time of the commodity.

Step 602: Set, in the newly-added information according to the feedback information, discount information and promotion information for the specific commodity, where the discount information and the promotion information are set according to the potential costs.

A rule of determining a special offer policy is that costs of the special offer policy are not greater than the potential costs. There may be multiple types of special offer policies, including directly giving a discount, giving an additional gift, giving bonus points, even giving a commodity for free, and the like.

When a commodity is delivered from a supplier, no corresponding target users request ordering of the commodity. During implementation of a specific delivery operation, to achieve the optimal delivery effect, the delivery rule is that a user that has made an order request has the highest priority, therefore, when the first data device receives an order request of a user, and a distance between an address of the ordering user and an address of the commodity that has been delivered is less than a set threshold, a priority of the ordering user may be set to be the highest according to the delivery rule, and therefore, in this embodiment of the present disclosure, after the combining the multiple pieces of address information to form one piece of commodity delivery information, and sending the commodity delivery information to the second data processing device, the method further includes during the delivery of the specific commodity, when the first data processing device receives ordering information of an ordering user, determining, by the first data processing device according to the ordering information, whether a distance between a geographical location of the ordering user and a current location of the specific commodity is less than a second threshold, and if yes, generating a first adjustment instruction according to an address of the ordering user, and sending the first adjustment instruction to the second data processing device such that the commodity delivery person delivers, according to the first adjustment instruction, the specific commodity from the current location to the geographical location that corresponds to the address of the ordering user.

Further, although multiple target users are determined, and a corresponding policy is provided to enable the multiple target users to purchase the specific commodity, for uncertainty of the prediction, there may still be a possibility that no user receive the specific commodity after the specific commodity is delivered to all users. To solve the foregoing problem and reduce costs of the delivery to the lowest, in the solution provided in this embodiment of the present disclosure, before the combining the multiple pieces of address information to form one piece of commodity delivery information, and sending the commodity delivery information to the second data processing device, the method steps further include determining, by the first data processing device in the multiple pieces of address information, a target address to which the specific commodity is last delivered, determining, according to the target address, an address of a store capable of selling the specific commodity, updating the default address as the store address, and sending a second adjustment instruction to the second data processing device such that the commodity delivery person delivers, according to the second adjustment instruction, the specific commodity to the store that corresponds to the store address.

Figure 7:
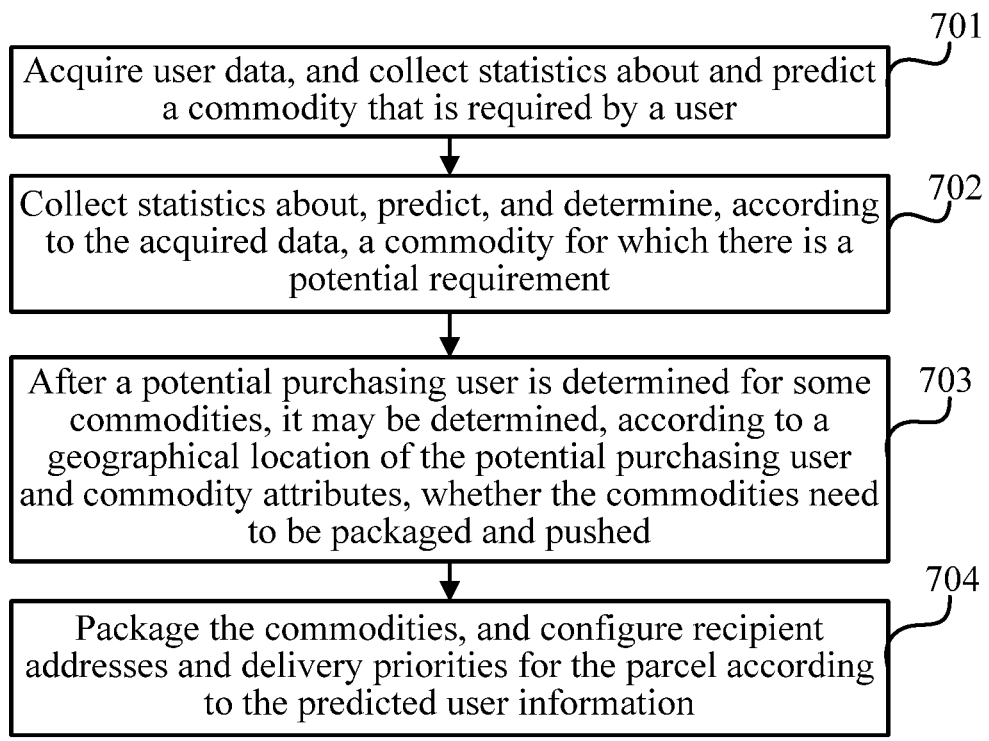
FIG. 7 is a schematic flowchart of a method for determining a target user according to user data in the method according to Embodiment 4 of the present disclosure.

As shown in FIG. 7, the specific implementation of the "determining, by the first data processing device according to historical information of users, multiple target users that potentially will purchase a specific commodity" in step 501 of the method provided in this embodiment of the present disclosure may be:

Step 701: Acquire user data, and collect statistics about and predict a commodity that is required by a user.

For example, user related information is searched for on the Internet. The user related information includes a user transaction record, a browsing history record, a wish list, a shopping cart, a favorites folder, or the like from an e-commerce portal, a user transaction record, a user consultation call, try-on/try-out information, user questionnaire information, market research information, and the like form a physical store, user social and interest information from a social network, including a microblog posted by a user, a microblog followed by the user, a browsing history, a post, and the like, information about an environment in which each user is located that is stored in an external environment database, such as a city in which a user is located, the weather of the city, a significant event that happened recently, or latest prevailing information, or user personal information from a user personal information database, such as interests and hobbies, an itinerary, a status of a business trip, a calendar, a memo of a user, or various events, and interests and hobbies of a family member of the user.

Step 702: Collect statistics about, predict, and determine, according to the acquired data, a commodity for which there is a potential requirement.

There are many prediction methods. For example, statistics is collected and prediction is performed based on a purchase history, weighting calculation is performed on a comprehensive interest degree based on various parameters, a commodity requirement is predicted in a unit of group according to user similarities, and a purchasing user of a future evolved commodity is predicted according to a purchase status of a previous similar product.

In an embodiment, a required time of a user that has a potential requirement for these commodities may further be predicted, thereby determining a specific packing and delivery time and priorities.

Step 703: After a potential purchasing user is determined for some commodities, it may be determined, according to a geographical location of the potential purchasing user and commodity attributes, whether the commodities need to be packaged and pushed.

For example, it is determined that these commodities are packaged and delivered only when a quantity of users, within a same geographical area, that have a potential requirement is greater than a threshold, and this may further reduce costs of failed delivery.

In an embodiment, it may further be predicted, according to the commodity attributes, whether the commodities need to be packaged and delivered, for example, such prediction is performed according to commodity costs, profits, yields, inventories, availability, risks of transportation of the commodities (such as transportation costs of resending of the commodities), and proportions of commodities that are transported in advance.

Step 704: Pack the commodities, and configure recipient addresses and delivery priorities for the parcel according to the predicted user information. The recipient addresses include addresses of multiple users, within a same geographical area, that have a potential requirement, and an address of one sales store within the area.

In an embodiment, there are multiple manners of determining the delivery priorities. For example, priorities may be arranged according to an order of distances of recipient addresses of users, to reduce delivery of finished products, or prediction may be performed according to importance of the users, where for example, a priority of a VIP user or a user with high credibility is high, or priorities may be arranged according to predicted urgency or time of a requirement of the users for these commodities, and priority is given to an urgent requirement, last, priorities may be determined according to a quantity of times that a user rejects a pushed parcel, and a priority of a user who rejects for many times is set to be low.

Embodiment 5

Figure 8:
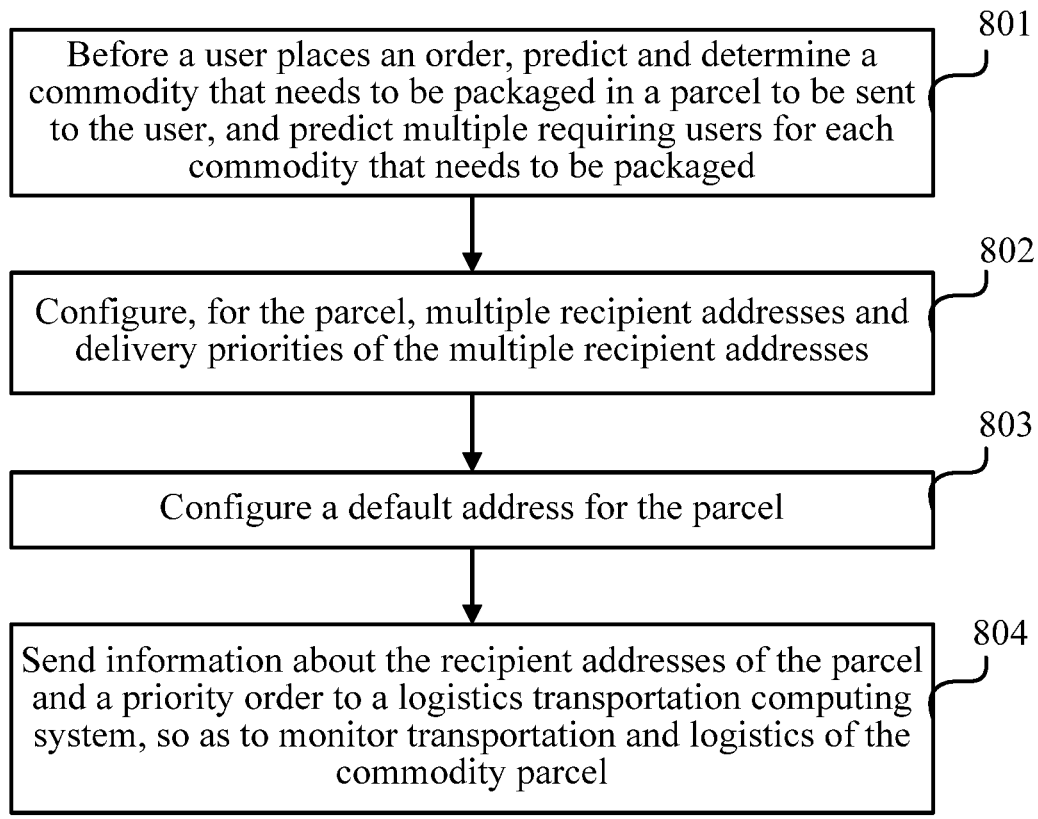
FIG. 8 is a schematic flowchart of a data processing method according to Embodiment 5 of the present disclosure.

When the method shown in FIG. 5 is applied to the fulfillment computer system and the logistics transportation computing system shown in FIG. 1B, a specific method may be implemented as follows (a method process is shown in FIG. 8):

Step 801: Before a user places an order, predict and determine a commodity that needs to be packaged in a parcel to be sent to the user, and predict multiple requiring users for each commodity that needs to be packaged.

In this embodiment of the present disclosure, there may be one or more predicted commodities in the parcel according to a predicted user demand.

Step 802: Configure, for the parcel, multiple recipient addresses and delivery priorities of the multiple recipient addresses.

Multiple users that are located in a same geographical area are selected from multiple users that have a potential demand for the parcel, delivery priorities of these users are determined, and multiple recipient addresses and priorities of the multiple recipient addresses are configured for the parcel.

There are multiple determining methods for determining whether the multiple recipient addresses are located in a same geographical area, for example determining according to postal codes, where if the first several digits of postal codes of the multiple addresses are the same, it is considered that the multiple addresses are located in a same geographical area, determining whether the multiple recipient addresses are located in a same geographical area according to whether the addresses are located in a same province, a same city, a same district, or a same subdistrict, or according to categorization of door numbers in a same road section, or the like, and determining whether the multiple recipient addresses are located in a same geographical area according to an overall customer demand for a commodity in a geographical area.

Step 803: Configure a default address for the parcel.

If the default address is a sales address within a same geographical area, a priority is configured to be the lowest such that when no one receives the parcel, the parcel may be delivered to a store that sells the commodity, and the store is commissioned to sell the parcel, to reduce delivery costs of transferring the parcel to another geographical area.

In an embodiment, to increase a receiving rate of users, some policies, such as giving a discount, giving preference, giving a gift, or other manners may be used. A discount policy or a special offer policy may be determined according to a quantity of times for which a parcel is rejected, and costs of delivering the parcel to a next recipient address.

Step 804: Send information about the recipient addresses of the parcel and a priority order to a logistics transportation computing system to monitor transportation and logistics of the commodity parcel.

Embodiment 6

Figure 9:
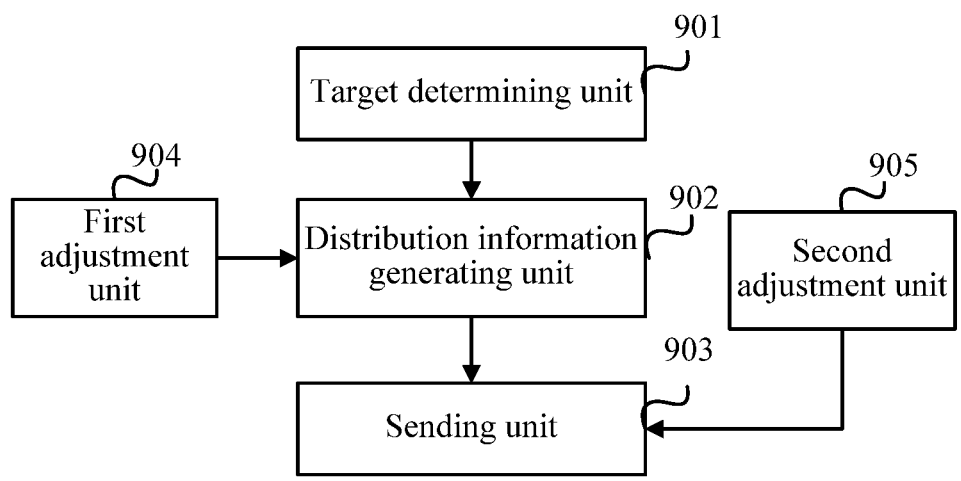
FIG. 9 is a schematic structural diagram of a data processing device according to an embodiment of the present disclosure.

As shown in FIG. 9, this embodiment of the present disclosure further provides a data processing device, where the data processing device generates commodity delivery information, the data processing device can exchange data with a second data processing device, the second data processing device provides a commodity delivery person with the commodity delivery information, and the data processing device includes A target determining unit 901 is configured to determine, according to historical information of users, multiple target users that potentially will purchase a specific commodity.

Further, the target determining unit 901 is further configured to determine whether a quantity of the users, within a range of a set geographical area, that potentially will purchase the specific commodity is greater than a first threshold, and if yes, determine that the multiple users, within the range of the set geographical area, that potentially will purchase the specific commodity are the target users.

A distribution information generating unit 902 is configured to acquire multiple pieces of address information that correspond to the multiple target users, and combine the multiple pieces of address information to form one piece of commodity delivery information.

The distribution information generating unit 902 is further configured to set a delivery order for the acquired multiple pieces of address information according to a preset parameter.

A sending unit 903 is configured to send the commodity delivery information to the second data processing device that provides the commodity delivery person with the commodity delivery information such that the second data processing device processes the commodity delivery information, and the commodity delivery person can deliver the specific commodity to at least one of the multiple target users according to one or more of the multiple pieces of address information included in the commodity delivery information processed by the second data processing device.

To increase the possibility of ordering the specific commodity by a user, the data processing device provided in this embodiment of the present disclosure further includes:

After the commodity is delivered to one corresponding address of the multiple pieces of address information, the data processing device further includes a first adjustment unit 904 configured to receive feedback information that is sent by the second data processing device for a delivery status of the specific commodity, and push newly-added information of the specific commodity to the second data processing device according to the feedback information, and a second adjustment unit 905 configured to before the multiple pieces of address information are combined to form one piece of commodity delivery information, and the commodity delivery information is sent to the second data processing device, determine, in the multiple pieces of address information, a target address to which the specific commodity is last delivered, determine, according to the target address, an address of a store capable of selling the specific commodity, update the default address as the store address, and send a second adjustment instruction to the second data processing device such that the commodity delivery person delivers, according to the second adjustment instruction, the specific commodity to the store that corresponds to the store address.

The foregoing one or more technical solutions in the embodiments of this application have at least the following technical effects:

In the solutions provided in the embodiments of the present disclosure, multiple users that currently may need to purchase a commodity are predicted according to historical data of the users. Before a user places an order, a predicted commodity is packaged and delivered to the multiple users. To reduce an error rate of prediction, multiple users that have a potential requirement are predicted for a commodity that is to be delivered, and recipient addresses of the multiple requiring users, a default sales store address, and a delivery order are configured for the commodity parcel, thereby effectively reducing a delay caused by logistics during electronic shopping.

In addition, addresses of target users and an address of a sales store that are selected in this embodiment of the present disclosure are all located in a same geographical area, thereby reducing logistics costs to the greatest extent.

The method described in the present disclosure is not limited to the embodiments described in the specific implementation manners, and other implementation manners obtained by a person skilled in the art according to the technical solutions of the present disclosure also fall within the scope of technological innovation of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A data processing system, comprising:
   a first data processing device configured to generate commodity delivery information of a plurality of users, wherein the first data processing device is configured to:
   predict, according to historical information of the users, a plurality of target users that are potential purchasers of a specific commodity, wherein the target users are a subset of the users;
   acquire multiple pieces of address information that correspond to respective addresses of the target users;
   combine one or more of the multiple pieces of address information of the target users to obtain commodity delivery information for the specific commodity; and
   send the commodity delivery information; and
   a second data processing device communicatively coupled to the first data processing device and configured to:
   receive the commodity delivery information;
   process the commodity delivery information;
   directly display the commodity delivery information to permit the specific commodity to be packaged and shipped directly to an address of at least one of the target users comprising the potential purchasers of the specific commodity according to the commodity delivery information;
   provide, to the first data processing device, feedback information regarding the specific commodity; and
   receive, from the first data processing device, new commodity information associated with the specific commodity in response to providing the feedback information, wherein the new commodity information is pushed by the first data processing device.

2. The data processing system of claim 1, wherein the first data processing device is further configured to determine the users that are the potential purchasers of the specific commodity are the target users within a range of a set geographical area.

3. The data processing system of claim 2, wherein the first data processing device is further configured to:

determine whether a quantity of the users that are the potential purchasers of the specific commodity within the range of the set geographical area is greater than a first threshold; and determine that the users that are the potential purchasers of the specific commodity within the range of the set geographical area are the target users when a quantity of users that are the potential purchasers of the specific commodity within the range of the set geographical area is greater than the first threshold.

4. The data processing system of claim 1, wherein the first data processing device is further configured to determine, according to one or a combination of multiple of user transaction data information, commodity logistics data information, environment data information, and user social data information that are in the historical information, and the target users that are the potential purchasers of the specific commodity.

5. The data processing system of claim 1, wherein the first data processing device is further configured to set a delivery order for the multiple pieces of address information according to a preset parameter.

6. The data processing system of claim 5, wherein the first data processing device is further configured to set the delivery order for the multiple pieces of address information according to at least one of a distance parameter between a receiving location of a target user and a sending location of the specific commodity, an importance parameter of the target user, or an urgency parameter of a requirement of the target user for the specific commodity.

7. The data processing system of claim 1, wherein after the commodity is delivered to one corresponding address of the multiple pieces of address information, the first data processing device is further configured to:

receive feedback information from the second data processing device for a delivery status of the specific commodity; and push newly-added information of the specific commodity to the second data processing device according to the feedback information.

8. The data processing system of claim 7, wherein the first data processing device is further configured to set, in the newly-added information according to the feedback information, discount information and promotion information for the specific commodity.

9. The data processing system of claim 1, wherein the first data processing device is further configured to:

determine, according to ordering information, whether a distance between a geographical location of an ordering user and a current location of the specific commodity is less than a second threshold during each of the delivery of the specific commodity and when the first data processing device receives ordering information of an ordering user;

generate a first adjustment instruction according to an address of the ordering user when the distance between the geographical location of the ordering user and the current location of the specific commodity is less than a second threshold; and send the first adjustment instruction to the second data processing device, and wherein the second data processing device is further configured to process the first adjustment instruction such that the specific commodity is delivered, according to the first adjustment instruction, from the current location to the geographical location that corresponds to the address of the ordering user.

10. The data processing system of claim 1, wherein the first data processing device is further configured to:

add a default address to the commodity delivery information;

determine, in the multiple pieces of address information, a target address to which the specific commodity is last delivered;

determine, according to the target address, an address of a store capable of selling the specific commodity;

update the default address as the store address;

send a second adjustment instruction to the second data processing device, and wherein the second data processing device is further configured to process the second adjustment instruction such that the specific commodity is delivered, according to the second adjustment instruction, to the store that corresponds to the store address.

11. The data processing system of claim 4, wherein the first data processing device is further configured to calculate the historical information of the users, using at least one of a weighting calculation method or a similarity calculation method, to determine the target users that are the potential purchasers of the specific commodity.

12. A data processing method applied to a data processing system for delivering a specific commodity, wherein the method comprises:

predicting, by a first data processing device according to historical information of a plurality of users, a plurality of target users are potential purchasers of a specific commodity, wherein the target users are a subset of the users;

acquiring, by the first data processing device, multiple pieces of address information that correspond to respective addresses of the target users;

combining, by the first data processing device, one or more of the multiple pieces of address information of the target users to obtain commodity delivery information for the specific commodity;

sending, by the first data processing device, the commodity delivery information to a second data processing device to permit the second data processing device to:
receive the commodity delivery information;
process the commodity delivery information; and
directly display the commodity delivery information to enable the specific commodity to be packaged and shipped directly to an address of at least one of the target users according to the commodity delivery information processed by the second data processing device;

receiving, by the first data processing device, feedback information regarding the specific commodity; and sending, to the second data processing device, new commodity information associated with the specific commodity to the second data processing device in response to receiving the feedback information, wherein the new commodity information is pushed by the first data processing device.

13. The data processing method of claim 12, wherein determining, according to historical information of users, the target users that are the potential purchasers of the specific commodity comprises:

determining, by the first data processing device according to the historical information of the users, the users that are the potential purchasers of the specific commodity within a range of a set geographical area; and determining that the users are the target users.

14. The data processing method of claim 13, wherein, before determining that the multiple users are the target users, the method further comprises:
  determining, by the first data processing device, whether a quantity of the users that are the potential purchasers of the specific commodity is greater than a first threshold within the range of the set geographical area; and
  determining that the users are the target users when the quantity of the users that are the potential purchasers of the specific commodity is greater than the first threshold within the range of the set geographical area.

15. The data processing method of claim 12, wherein the historical information comprises at least one of a multiple of user transaction data information, commodity logistics data information, environment data information, or user social data information.

16. The data processing method of claim 12, wherein combining the multiple pieces of address information to form the one piece of commodity delivery information comprises:
  setting, by the first data processing device, a delivery order for the multiple pieces of address information according to a preset parameter; and
  combining, by the first data processing device and according to the delivery order, the multiple pieces of address information to obtain the commodity delivery information.

17. The data processing method of claim 16, wherein setting, by the first data processing device, the delivery order for the multiple pieces of address information according to the preset parameter comprises setting, by the first data processing device, the delivery order for the multiple pieces of address information according to at least one of a distance parameter between a receiving location of a target user of the target users and a sending location of the specific commodity, an importance parameter of the target user, or an urgency parameter of a requirement of the target user for the specific commodity.

18. The data processing method of claim 12, wherein after the commodity is delivered to one corresponding address of the multiple pieces of address information, the method further comprises:
  receiving, by the first data processing device, feedback information from the second data processing device for a delivery status of the specific commodity; and
  pushing, by the first data processing device, newly-added information of the specific commodity to the second data processing device according to the feedback information.

19. The data processing method of claim 18, further comprising setting, by the first data processing device in the newly-added information according to the feedback information, discount information and promotion information for the specific commodity.

20. The data processing method of claim 12, wherein after combining the multiple pieces of address information to obtain the commodity delivery information and sending the commodity delivery information to the second data processing device, the method further comprises:
  determining, by the first data processing device according to ordering information, whether a distance between a geographical location of an ordering user and a current location of the specific commodity is less than a second threshold during each of the delivery of the specific commodity and when the first data processing device receives ordering information of an ordering user;
  generating, by the first data processing device, a first adjustment instruction according to an address of the ordering user when the distance between the geographical location of the ordering user and the current location of the specific commodity is less than the second threshold; and
  sending, by the first data processing device, the first adjustment instruction to the second data processing device such that the specific commodity is delivered according to the first adjustment instruction from the current location to the geographical location that corresponds to the address of the ordering user.

21. The data processing method of claim 12, wherein before combining the multiple pieces of address information to obtain the commodity delivery information and sending the commodity delivery information to the second data processing device, the method further comprises:
  adding a default address to the commodity delivery information;
  determining, by the first data processing device in the multiple pieces of address information, a target address to which the specific commodity is last delivered;
  determining, by the first data processing device and according to the target address, an address of a store capable of selling the specific commodity;
  updating, by the first data processing device, the default address as the store address; and
  sending, by the first data processing device, a second adjustment instruction to the second data processing device such that the specific commodity is delivered, according to the second adjustment instruction to the store that corresponds to the store address.

22. The data processing method of claim 12, wherein determining, according to the historical information of the users, the target users that are the potential purchasers of the specific commodity comprises calculating, by the first data processing device, the historical information of the users using at least one of a weighting calculation method or a similarity calculation method to determine the target users that are the potential purchasers of the specific commodity.

23. A data processing device configured to generate commodity delivery information and exchange data with a second data processing device, wherein the data processing device comprises:
  a processor configured to:
    predict, according to historical information of a plurality of users, a plurality of target users that are potential purchasers of a specific commodity, wherein the target users are a subset of the users;
    acquire multiple pieces of address information that correspond to respective addresses of the target users; and
    combine one or more of the multiple pieces of address information of the target users to obtain commodity delivery information for the specific commodity; and
  a transmitter coupled to the processor and configured to send the commodity delivery information to the second data processing device to permit the second data processing device to:
    process the commodity delivery information; and
    directly display the commodity delivery information to enable the specific commodity to be packaged and shipped directly to an address of at least one of the target users comprising the potential purchasers of the specific commodity according to the commodity delivery information processed by the second data processing device; and a receiver coupled to the processor and the transmitter and configured to receive, from the second data processing device, feedback information regarding the specific commodity, wherein the transmitter is configured to transmit, to the second data processing device, new commodity information associated with the specific commodity in response to providing the feedback information, wherein the new commodity information is pushed by the first data processing device.

24. The data processing device of claim 23, wherein the processor is further configured to:
   determine whether a quantity of the users within a range of a set geographical area that are the potential purchasers of the specific commodity is greater than a first threshold; and
   determine that the users within the range of the set geographical area that are the potential purchasers of the specific commodity are the target users when the quantity of the users within the range of the set geographical area that potentially will purchase the specific commodity is greater than the first threshold.

25. The data processing device of claim 23, wherein the processor is further configured to set a delivery order for the multiple pieces of address information according to a preset parameter.

26. The data processing device of claim 23, further comprising a receiver coupled to the processor, and wherein after the commodity is delivered to one corresponding address of the multiple pieces of address information, the receiver is configured to receive feedback information from the second data processing device for a delivery status of the specific commodity, and wherein the transmitter is further configured to push newly-added information of the specific commodity to the second data processing device according to the feedback information.

27. The data processing device of claim 23, wherein the processor is further configured to:
   add a default address to the commodity delivery information;
   determine, in the multiple pieces of address information, a target address to which the specific commodity is last delivered before the multiple pieces of address information are combined to obtain the commodity delivery information and the commodity delivery information is sent to the second data processing device;
   determine, according to the target address, an address of a store capable of selling the specific commodity; and
   update the default address as the store address, and
   wherein the transmitter is further configured to send a second adjustment instruction to the second data processing device such that the specific commodity is delivered, according to the second adjustment instruction, to the store that corresponds to the store address.

* * * * *